(12) United States Patent
Itasaki et al.

(10) Patent No.: US 10,306,417 B2
(45) Date of Patent: May 28, 2019

(54) WIRELESS COMMUNICATION METHOD, INFORMATION PROCESSING APPARATUS, AND RECORDING MEDIUM

(71) Applicant: FUJITSU LIMITED, Kawasaki-shi, Kanagawa (JP)

(72) Inventors: Akira Itasaki, Yokohama (JP); Shinichi Shiotsu, Kawasaki (JP); Akira Fujii, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/805,096

(22) Filed: Nov. 6, 2017

(65) Prior Publication Data
US 2018/0139582 A1  May 17, 2018

(30) Foreign Application Priority Data
Nov. 14, 2016 (JP) .................. 2016-221612

(51) Int. Cl.
*H04W 4/02* (2018.01)
(52) U.S. Cl.
CPC ........... *H04W 4/027* (2013.01); *H04W 4/023* (2013.01)
(58) Field of Classification Search
CPC .............................. H04W 4/023; H04W 4/027
See application file for complete search history.

(56) References Cited

U.S. PATENT DOCUMENTS

| 2009/0017840 A1* | 1/2009 | Camp, Jr. ............ G01C 21/367 455/456.3 |
| 2015/0111575 A1* | 4/2015 | Lei ......................... H04W 36/08 455/436 |
| 2016/0343256 A1* | 11/2016 | Song ..................... H04W 4/029 |

FOREIGN PATENT DOCUMENTS

| JP | 2001-311626 | 11/2001 |
| JP | 2002-132820 | 5/2002 |
| JP | 2004-159151 | 6/2004 |
| JP | 2010-048797 | 3/2010 |
| JP | 2014-016248 | 1/2014 |

* cited by examiner

*Primary Examiner* — Said M Elnoubi
(74) *Attorney, Agent, or Firm* — Fujitsu Patent Center

(57) ABSTRACT

A wireless communication method executed by a processor included in an information processing apparatus, the wireless communication method includes determining, based on a moving speed of a moving object and an amount of downloading time for specific information that is provided to a terminal device within a given range relative to the moving object, a transmission area into which the specific information is to be transmitted; and transmitting the specific information to the terminal device present in the determined transmission area.

11 Claims, 13 Drawing Sheets

FIG. 4

| BEACON ID 191 | MOVING SPEED [km/h] 192 | SERVICE INFORMATION 193 | NUMBER OF PROPAGATIONS 194 | DL TIME INFORMATION [s] 195 |
|---|---|---|---|---|
| A | 10 | APP a | 5 | 50 |
| B | 12 | APP b | 4 | 40 |
| ⋮ | ⋮ | ⋮ | ⋮ | ⋮ |

| BEACON ID | SERVICE INFORMATION | NUMBER OF PROPAGATIONS [s] | DESIRED RECEIPT TIME INFORMATION [s] |
|---|---|---|---|
| BEACON 1 | CHEER APP a | 50 | 60 |
| BEACON 2 | CHEER APP b | 5 | 90 |
| BEACON 3 | PLAYER A EXPLANATORY INFORMATION | 100 | 180 |
| BEACON 4 | PLAYER B EXPLANATORY INFORMATION | 100 | 180 |
| BEACON 5 | PLAYER A IMAGE INFORMATION | 200 | 180 |
| BEACON 6 | PLAYER B IMAGE INFORMATION | 200 | 180 |
| ⋮ | ⋮ | ⋮ | ⋮ |

WIRELESS COMMUNICATION METHOD, INFORMATION PROCESSING APPARATUS, AND RECORDING MEDIUM

CROSS-REFERENCE TO RELATED APPLICATION

This application is based upon and claims the benefit of priority of the prior Japanese Patent Application No. 2016-221612, filed on Nov. 14, 2016, the entire contents of which are incorporated herein by reference.

FIELD

The embodiments discussed herein are related to a wireless communication method, an information processing apparatus, and a recording medium.

BACKGROUND

There is known a technology in which when a terminal device receives a beacon signal, the terminal device sends the beacon identifier (ID) of the received signal to a server, and the server delivers bonus information such as an application or content (a coupon or the like) in accordance with the beacon ID (for example, see Japanese Laid-open Patent Publication No. 2004-159151).

The technology in which a terminal device at a specific location at which the terminal device receives a beacon signal or in a specific state such as a specific category (hereinafter also referred to as a place) receives delivery of specific information specialized for that place is also referred to as a place-based service hereinafter. The occurrence in which a terminal device enters a specific state is also referred to as check-in. The occurrence in which a terminal device exits the specific state is also referred to as check-out.

According to Japanese Laid-open Patent Publication No. 2004-159151, a radio frequency identification (RF-ID) tag is attached to each runner running in a race, and a receiver is placed on a gate. Further, electromagnetic waves emitted by the RF-ID tag attached to the runner are received by the receiver, and the specific frequency of the electromagnetic waves is detected, so that it is detected which runner has passed the gate. Further, information about a runner acquired from the RF-ID tag and the time at which the runner passes through the gate are stored in association with each other. As related art technologies, for example, Japanese Laid-open Patent Publication No. 2014-16248, Japanese Laid-open Patent Publication No. 2001-311626, Japanese Laid-open Patent Publication No. 2010-48797, and Japanese Laid-open Patent Publication No. 2002-132820 are disclosed.

However, with the above technologies, when a runner moves at high speed, the amount of time from a time at which a terminal device "checks in" a place to a time at which the runner reaches a location where the terminal device is present is short. Therefore, when information about the runner is delivered from a server to the terminal device, the runner has already passed by the user or is immediately prior to passing by the user, and thus the user is not able to reference the delivered information about the runner before the user cheers the runner passing by the user. In view of the above, it is desirable that specific information be able to be delivered to a terminal device in a specific state at an appropriate timing.

SUMMARY

According to an aspect of the invention, a wireless communication method executed by a processor included in an information processing apparatus, the wireless communication method includes determining, based on a moving speed of a moving object and an amount of downloading time for specific information that is provided to a terminal device within a given range relative to the moving object, a transmission area into which the specific information is to be transmitted; and transmitting the specific information to the terminal device present in the determined transmission area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a data storage database (DB) according to an embodiment;

FIG. 5 is a diagram illustrating an example of an application DB according to an embodiment;

DESCRIPTION OF EMBODIMENTS

Figure 1:
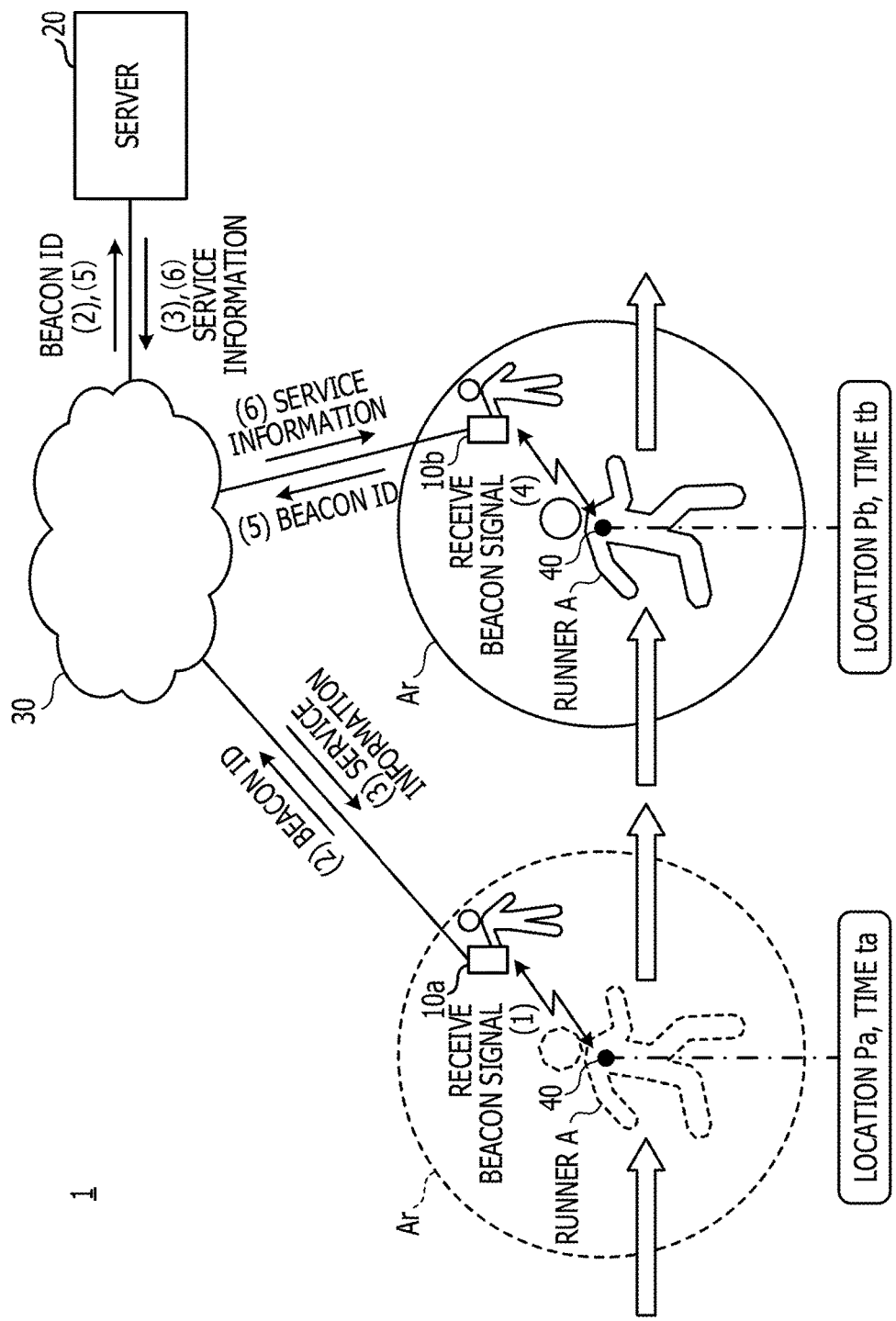
FIG. 1 is a diagram for illustrating an example of a wireless communication system according to an embodiment.

Hereinafter, embodiments of the present disclosure will be described with reference to the accompanying drawings. Herein and in the drawings, components having substantially the same functional configurations are denoted by the same reference letters, and thus overlapping description thereof is omitted.

First, an example of a configuration of a wireless communication system 1 according to an embodiment of the present disclosure will be described with reference to FIG. 1. FIG. 1 illustrates an example of a configuration of the wireless communication system 1 according to the present embodiment. The wireless communication system 1 according to the present embodiment is a system that provides a place-based service. The wireless communication system 1 according to the present embodiment includes a transmitter 40, a plurality of terminal devices 10a and 10b (hereinafter, terminal devices are sometimes generically referred to as "terminal devices 10"), and a server 20.

The terminal device 10 is an example of an information processing apparatus that receives specific information from the server 20. As examples of the information processing apparatus, a personal computer, a tablet computer, a smartphone, a cellular telephone, and a personal digital assistant (PDA) are listed. The information processing apparatus may be a wearable device such as a head mount display (HMD) or a face mount display (FMD).

The terminal device 10 is coupled to the server 20 via, for example, an access point (AP) by using a network 30 such as the Internet. When the terminal device 10, which has received beacon radio waves from the transmitter 40, transmits the beacon ID to the server 20, the server 20 delivers bonus information such as an application or content (such as a coupon) in accordance with the beacon ID. The server 20 is an example of an information processing apparatus that delivers service information such as the bonus information mentioned above to the terminal device 10. The server 20 may be an information processing apparatus provided on the cloud.

The technology referred to as a place-based service offers a service specialized for a place in accordance with the place. For example, a place-based service is used for presentation of detailed information at each tourist spot, distribution of documents in a conference room, and the like. Here, "tourist spot" and "conference room" are examples of a place related to a specific location. "Presentation of detailed information" and "distribution of documents" are examples of specific information that is provided to the terminal device 10 that "has checked in" the place (such specific information is hereinafter also referred to as "service information").

With a place-based service, as indicated by (1) to (6) in FIG. 1, service information is provided from the server 20 to the terminal devices 10a and 10b.

(1) When the terminal device 10a enters a coverage area Ar of radio waves transmitted by the transmitter 40 (check-in), the terminal device 10a receives a beacon signal. Thereby, the terminal device 10a detects approach of the transmitter 40 that transmits the beacon radio waves.

(2) The terminal device 10a, which has received the beacon signal, transmits the acquired beacon ID to the server 20.

(3) The server 20 delivers service information corresponding to the received beacon ID to the terminal device 10a.

Thus, after the terminal device 10a has completed downloading the delivered service information, the user may read the service information.

In cases where the transmitter 40 is attached to a moving object such as a runner A, the place moves. That is, the service area where service information is provided moves. For example, at a time ta, the terminal device 10a "checks in" and receives service information from the server 20. At a time tb, the terminal device 10a "checks out" and the terminal device 10b "checks in". Therefore, the terminal device 10a is not capable of receiving service information, and the terminal device 10b is capable of receiving the service information.

Specifically, (4) when the terminal device 10b enters the coverage area Ar of radio waves transmitted by the transmitter 40 (check-in), the terminal device 10b receives a beacon signal.

(5) The terminal device 10b, which has received the beacon signal, transmits the acquired beacon ID to the server 20.

(6) The server 20 delivers service information corresponding to the received beacon ID to the terminal device 10b.

As described above, "place (specific state)" where a service may be provided is not a fixed location but an area moving with time when the transmitter 40 moves along with a moving object. In the present embodiment, particularly when the place moves, specific information is delivered to the terminal device 10 in a specific state at an appropriate timing.

Hereinafter, description will be given of the case where a runner is listed as an example of "moving object". However, the moving object to which the transmitter 40 is attached is not limited to a runner but includes, for example, any vehicle such as a cyclic bus, a rental bicycle, an automobile, an electric train, or a bike.

Figure 2:
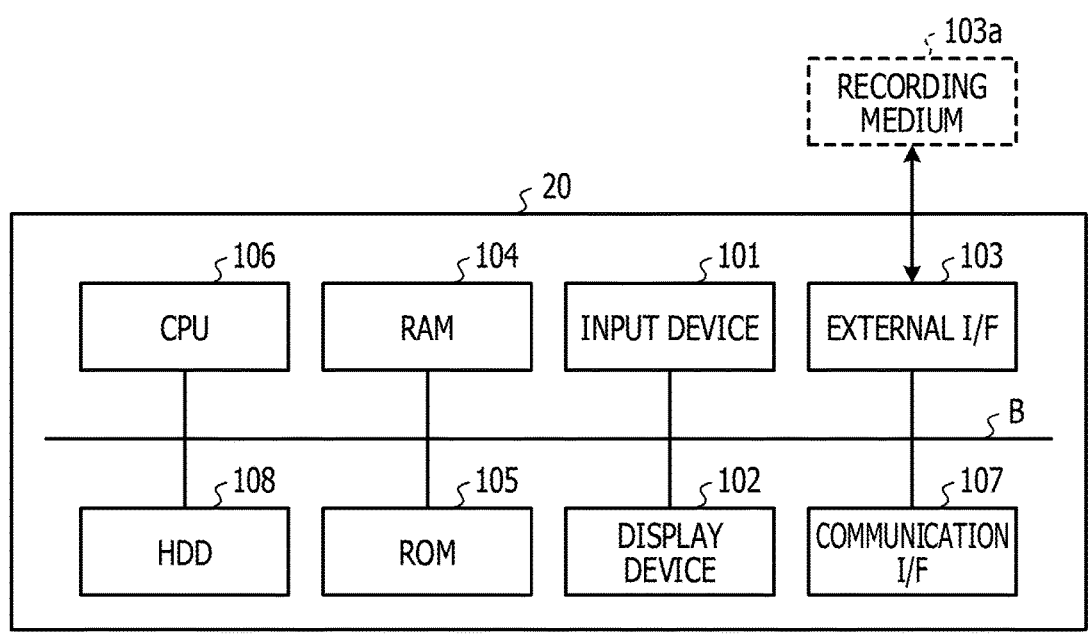
FIG. 2 is a diagram illustrating an example of a hardware configuration of a server according to an embodiment.

Next, an example of a hardware configuration of the server 20 according to the present embodiment will be described with reference to FIG. 2. FIG. 2 illustrates an example of a hardware configuration of the server 20 according to the present embodiment. The hardware configuration of the server 20 is the same as the hardware configuration of the terminal device 10. Therefore, description is given of the hardware configuration of the server 20 here, and description of the terminal device 10 is omitted.

The server 20 includes an input device 101, a display device 102, an external interface (I/F) 103, a random access memory (RAM) 104, a read only memory (ROM) 105, a central processing unit (CPU) 106, a communication I/F 107, and a hard disk drive (HDD) 108. The components coupled to one another by a bus B.

The input device 101 includes a keyboard, a mouse, and the like and is used for input of each operating signal to the server 20. The display device 102 includes a display and the like and displays various processing results. The communication I/F 107 is an interface for coupling the server 20 to the network 30. Thus, the server 20 is capable of performing data communication with other devices, such as the terminal devices 10, via the communication I/F 107.

The HDD 108 is a nonvolatile storage device in which programs and data are stored. The programs and data that are stored include an operating system that controls the entire server 20 and application software. For example, various databases, programs, and the like may be stored in the HDD 108.

The external I/F 103 is an interface with external devices. The external devices include a recording medium 103a and the like. Thus, the server 20 is capable of reading and writing data from and to the recording medium 103a via the external I/F 103.

The ROM 105 is a nonvolatile semiconductor memory capable of retaining the internal data when the power supply is turned off. In the ROM 105, programs for network setting and the like and data are stored. The RAM 104 is a volatile semiconductor memory that temporarily stores wireless communication programs and data. The CPU 106 is an arithmetic device that reads wireless communication programs and data from storage devices, such as the HDD 108 and the ROM 105, into the RAM 104 and executes a wireless communication process, thereby implementing control over the entire devices and the mounting functionality.

First Embodiment

Figure 3:
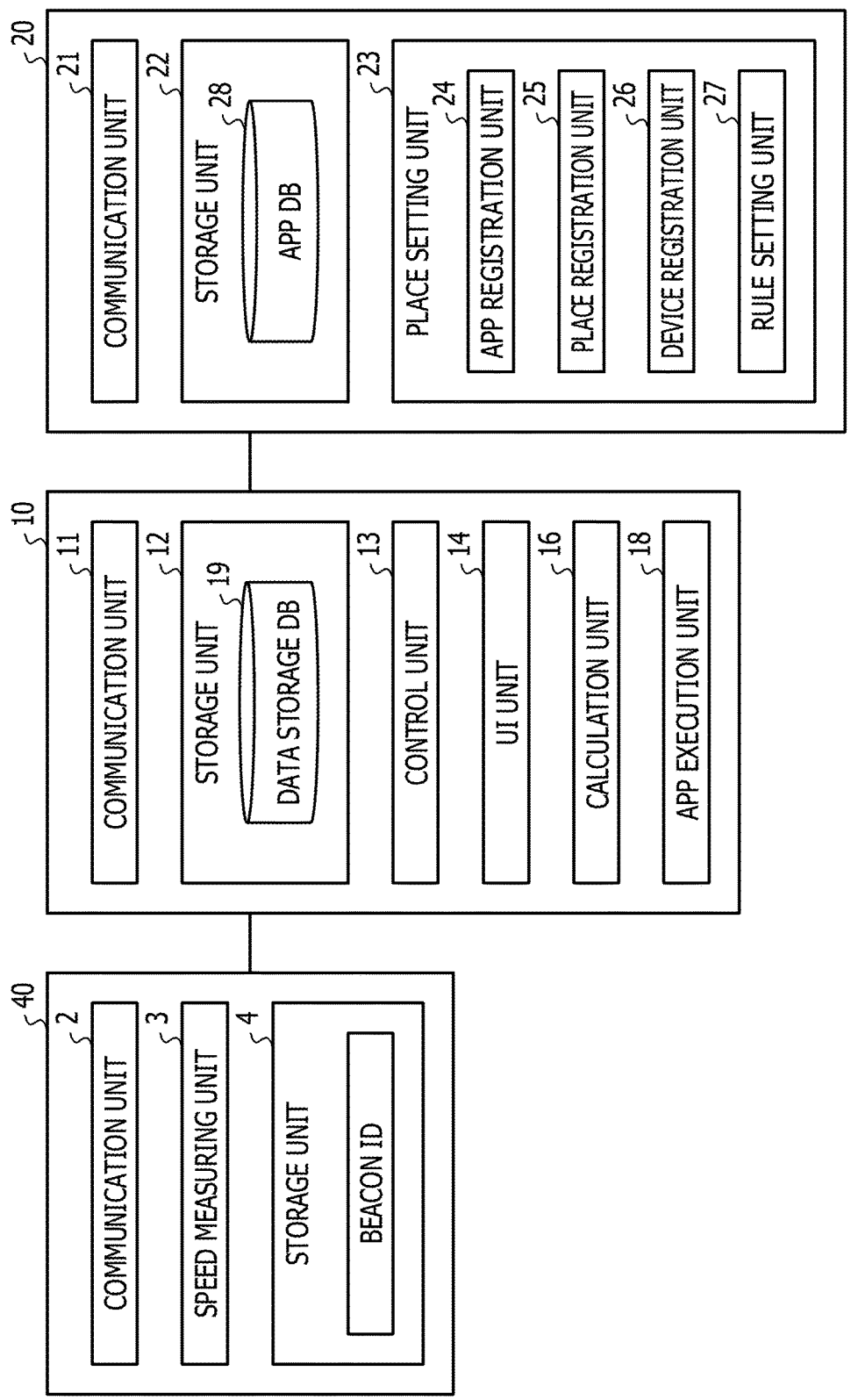
FIG. 3 is a diagram illustrating examples of functional configurations of a transmitter, a terminal device, and a server according to a first embodiment.

Next, examples of functional configurations of the transmitter 40, the terminal device 10, and the server 20 in the wireless communication system 1 according to a first embodiment will be described with reference to FIG. 3. FIG. 3 illustrates examples of functional configurations of the transmitter 40, the terminal device 10, and the server 20 according to the first embodiment.

First, the functional configuration of the transmitter 40 will be described. The transmitter 40 includes a communication unit 2, a speed measuring unit 3, and a storage unit 4. The speed measuring unit 3 measures the speed of a moving object. In the present embodiment, the speed measuring unit 3 measures the moving speed of the runner A with the transmitter 40. The speed measuring unit 3 may measure the moving speed of the runner A, for example, by a speed sensor attached to the transmitter 40. The storage unit 4 stores therein beacon IDs.

The communication unit 2 sends beacon signals to objects in a certain range by using a first wireless technology. The first wireless technology is short-range wireless communication at a maximum communication distance of around 10 to 100 m. The first wireless technology may be implemented by Bluetooth (registered trademark) Low Energy (BLE) or radio frequency identifier (RFID).

In the present embodiment, the speed measuring unit 3 measures the speed of a moving object and transmits the measured speed to the terminal device 10; however, the present disclosure is not limited to this. For example, the transmitter 40 may transmit only a beacon ID and, when receiving the beacon ID, the terminal device 10 may transmit location information to the server 20, thereby enabling the server 20 to calculate the speed and to notify the terminal device 10 of the calculated speed.

In cases where the terminal device 10 measures the moving speed, for example, the terminal device 10 may measure the speed of a moving object by using a speed gun or the like. In cases where the server 20 measures the speed, for example, the terminal device 10 that has received a beacon ID transmits the beacon ID and the location of a runner (the transmitter 40) acquired by using a global positioning system (GPS) to the server 20. The server 20 calculates the moving speed of the runner from the location acquired by using the GPS. Measurement of the speed of a moving object is not limited to the method mentioned above, and any known method may be used.

Next, the functional configuration of the terminal device 10 will be described. The terminal device 10 includes a communication unit 11, a storage unit 12, a control unit 13, a calculation unit 16, an app execution unit 18, and a user interface (UI) unit 14. The communication unit 11 transmits a beacon ID to the server 20 by using a second wireless technology and receives service information associated with the beacon ID from the server 20. The second wireless technology is a high-speed wireless communication that uses a wireless local area network (LAN) such as wireless fidelity (Wi-Fi; registered trademark) to couple the terminal device 10 to the server 20 and that is performed in a band such as the 2.4 GHz band or the 5 GHz band. In the second wireless technology, the communication distance is about 100 m. The second wireless technology may be implemented by using a carrier network. The function of the communication unit 11 may be achieved, for example, by the communication I/F 107.

The storage unit 12 stores therein a data storage database (DB) 19. FIG. 4 illustrates an example of the data storage DB 19. In the data storage DB 19, a moving speed 192, service information 193, the number of propagations 194, and downloading (DL) time information 195 are stored in association with the beacon ID 191. In the column of the moving speed 192, the speed of a moving object identified by the beacon ID 191 is saved. The service information 193 is specific information provided by the server 20. In the column of the downloading time information 195, the amount of time taken when service information is downloaded is stored. The number of propagations 194 is calculated using the following equation (1) for calculating the number of propagations.

Number of propagations=((amount of time for desired receipt+amount of downloading time)× moving speed)/distance traveled by beacon    (1)

The number of propagations represents the maximum number of the terminal devices 10 to which a beacon ID is propagated. The amount of time for desired receipt represents how much earlier than the time at which a moving object arrives at the terminal device 10 service information is desired to be received. The amount of time for desired receipt may be a fixed value or may be determined in accordance with service information. The distance traveled by a beacon is set in advance, as the initial value, to be around 10 m.

The storage unit 12 stores therein programs for executing the wireless communication process of the terminal device 10 and various types of data. The function of the storage unit 12 may be achieved, for example, by the RAM 104, ROM 105, and the HDD 108.

The control unit 13 dynamically changes a transmission area into which service information is to be transmitted, based on the speed of a moving object and the amount of downloading time for service information to be provided to the terminal device 10 that is in a specific state relative to the moving object (that is, that "has checked in").

The calculation unit 16 determines a transmission distance based on the moving speed and the amount of downloading time and calculates the number of propagations. Specifically, the calculation unit 16 calculates the number of propagations using equation (1). When the amount of time for desired receipt and the distance traveled by a beacon are set to fixed values, the calculation unit 16 calculates the number of propagations from the amount of downloading time for service information and the moving speed. The amount of downloading time for service information may be information transmitted from the server 20, or may be the amount of downloading time saved in the terminal device 10.

The app execution unit 18 executes an application included in service information and other applications. The functions of the control unit 13, the calculation unit 16, and the app execution unit 18 may be achieved, for example, by a process when a program installed in the terminal device 10 causes the CPU 106 to execute the process. The UI unit 14 has a user interface function used when touch interactions and the like are performed on a display and the like.

Next, the functional configuration of the server 20 will be described. The server 20 includes a communication unit 21, a storage unit 22, and a place setting unit 23. The communication unit 21 receives service information from the communication unit 11. The function of the communication unit 21 may be achieved, for example, by the communication I/F 107.

The storage unit 22 stores therein an app DB 28. FIG. 5 illustrates an example of the app DB 28. In the app DB 28, service information 282, downloading (DL) time information 283, and desired receipt time information 284 are stored in association with one another. For example, the beacon ID 281 transmitted by the terminal device 10 is beacon 1, a cheer app a stored in the service information 282 is provided to the terminal device 10.

The downloading time information 283 is the amount of time taken when the terminal device 10 downloads service information. The desired receipt time information 284 indicates how much earlier than the time at which a moving object passes through the location of the terminal device 10 service information is desired to be acquired. The amount of time for desired receipt may be determined by the terminal device 10, may be determined by the server 20, or may be set in advance to a fixed value.

Referring back to FIG. 3, the place setting unit 23 includes an app registration unit 24, a place registration unit 25, a device registration unit 26, and a rule setting unit 27. The app registration unit 24 registers a created application. The place registration unit 25 registers an application at a place. The device registration unit 26 registers a device that triggers the transmitter 40 or the like. The rule setting unit 27 sets a rule for delivering service information of an application or the like. The function of the place setting unit 23, for example, may be achieved by a process when a program installed in the server 20 causes the CPU 106 to execute the process.

FIG. 3 depicts a block diagram focused on functions. The components represented by functional blocks may be implemented only by hardware, only by software, or a combination of hardware and software.

Figure 6:
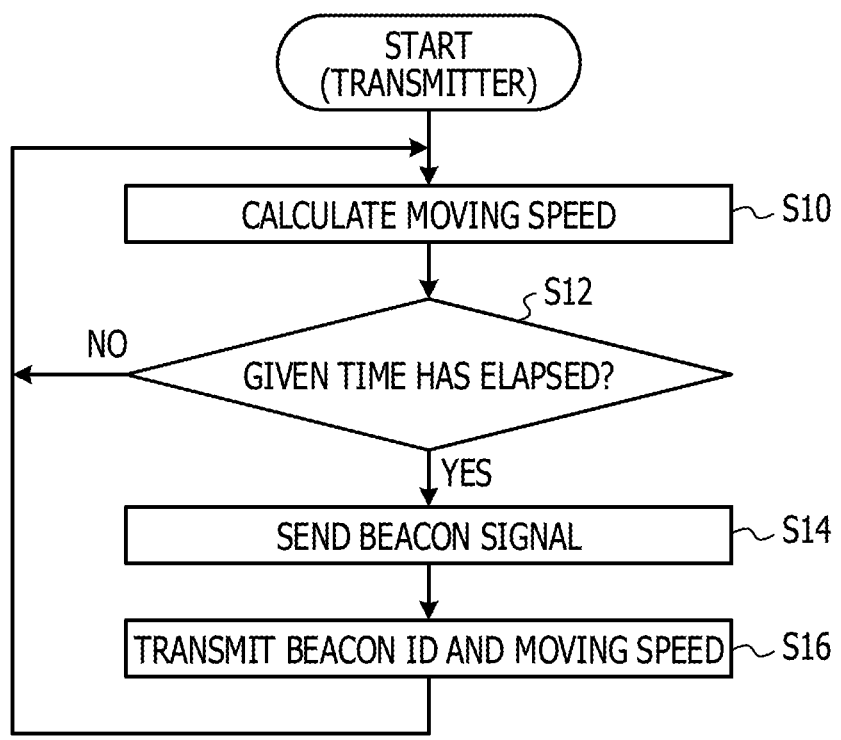
FIG. 6 is a flowchart illustrating an example of a transmission process according to an embodiment.

Next, an example of a beacon transmitting process according to the first embodiment will be described with reference to FIG. 6. FIG. 6 is a flowchart illustrating an example of a transmitting process according to the first embodiment. The transmitter 40 may be implemented by a process when a program for executing the transmitting process is installed and the program causes the processor of the transmitter 40 to execute the process. The process illustrated in FIG. 6 is executed by the transmitter 40. The beacon transmitting process illustrated in FIG. 6 is also used in a second embodiment.

As this process begins, the speed measuring unit 3 calculates a moving speed (S10). Next, the communication unit 2 determines whether a given time has elapsed (S12), and the process of S10 and S12 is repeated until the given time has elapsed. If the communication unit 2 determines that the given time has elapsed, the communication unit 2 sends a beacon signal (S14), transmits the beacon ID and the most recently calculated moving speed to the terminal device 10 (S16), and returns to S10. The process of S10 and the subsequent steps is repeated. Thus, a beacon signal of a given radio-field intensity is transmitted at every given time interval from the transmitter 40.

Figure 7:
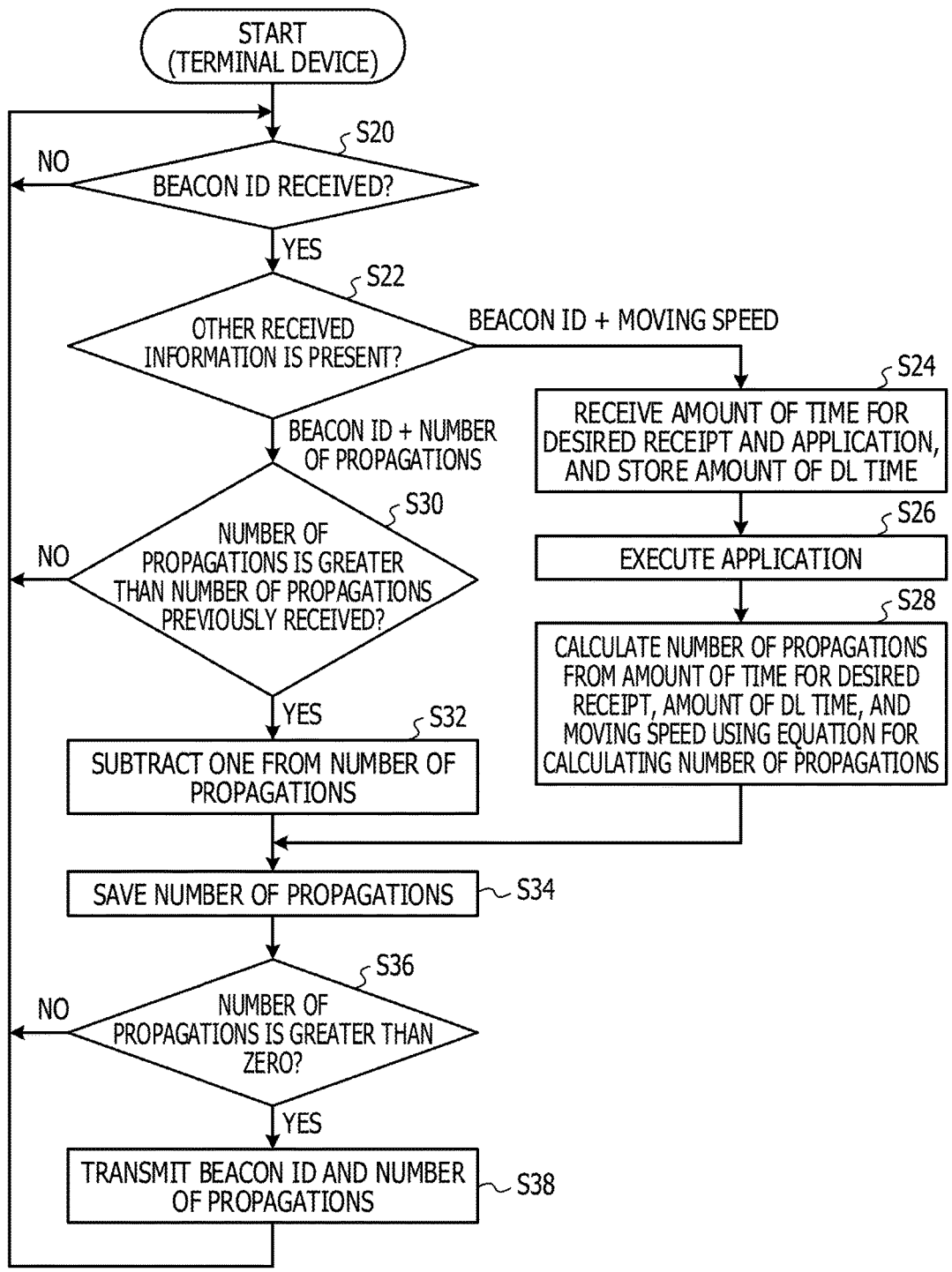
FIG. 7 is a flowchart illustrating an example of a wireless communication process of the terminal device according to the first embodiment.

Next, a wireless communication process according to the first embodiment will be described. FIG. 7 is a flowchart illustrating an example of a wireless communication process of the terminal device 10 according to the first embodiment.

In this process, "the number of propagations", which represents the maximum number of terminal devices 10 to which the terminal device 10 that has received a beacon signal may propagate the beacon ID thereof, is calculated.

Figure 8:
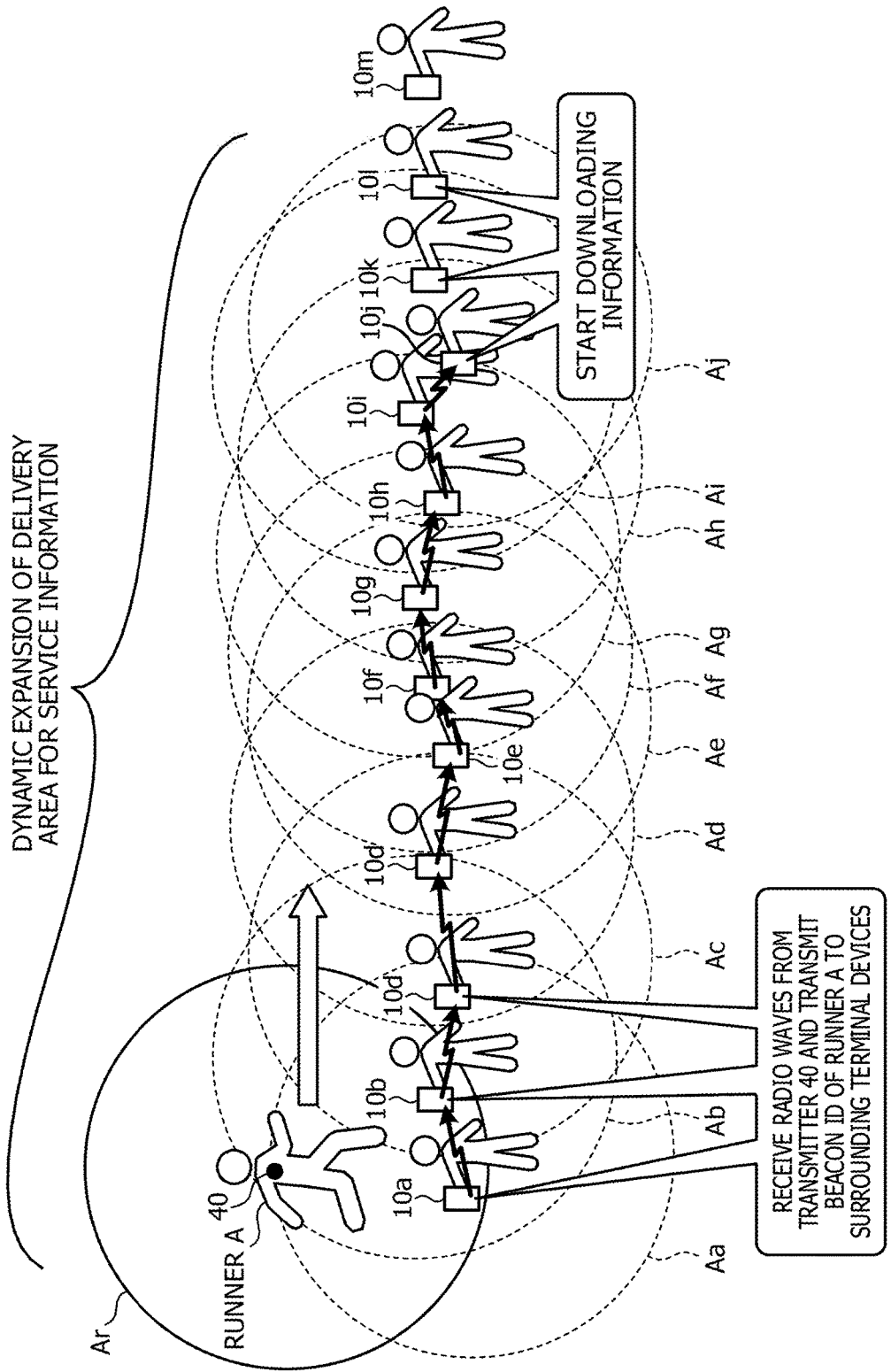
FIG. 8 is a diagram illustrating an example of dynamic control of a service area according to the first embodiment.

For example, in the example illustrated in FIG. 8, the terminal device 10a in the coverage area Ar of the transmitter 40 attached to the runner A receives a beacon signal and acquires the beacon ID thereof. The maximum number of other terminal devices 10 to which a beacon ID may be propagated when the beacon ID is transmitted from the terminal device 10a to the other terminal devices 10 is the number of propagations. For example, in cases where the number of propagations is 11, a beacon ID may be propagated to 11 terminal devices 10, the terminal device 10b, a terminal device 10c, a terminal device 10d, . . . , a terminal device 10k, and a terminal device 10l.

The process illustrated in FIG. 7 is executed by the terminal device 10a that receives a beacon signal and each of a plurality of terminal devices (the terminal devices 10b, 10c, 10d, . . . ) that are located around the terminal device 10a and to which the beacon ID may be propagated.

First, a wireless communication process that is executed by the terminal device 10a will be described. As this process begins, the communication unit 11 of the terminal device 10a determines whether the communication unit 11 has received a beacon signal and has acquired the beacon ID thereof (S20). The communication unit 11 repeats the process of S20 until receiving the beacon ID, and proceeds to S22 when determining that the communication unit 11 has received the beacon ID.

In S22, the calculation unit 16 determines what information has been received along with the beacon ID. At this point, the terminal device 10a has received the beacon ID and the moving speed from the transmitter 40. Therefore, the calculation unit 16 determines that the beacon ID and the moving speed have been received. The communication unit 11 receives the amount of time for desired receipt and an application from the server 20 and stores the time taken for the receipt in the column of the downloading time information 195 of the data storage DB 19 (S24). The received application is an example of service information. Next, the app execution unit 18 executes the received application (S26).

Next, the calculation unit 16 substitutes the amount of time for desired receipt, the amount of downloading time, and the moving speed in equation (1) to calculate the number of propagations (S28), and proceeds to S34. In the present embodiment, a fixed value, for example, of 10 m is set for the distance traveled by a beacon in equation (1).

Next, the storage unit 12 stores the calculated number of propagations in association with the received beacon ID in the data storage DB 19 (S34, see FIG. 4).

Next, the control unit 13 determines whether the number of propagations is greater than zero (S36). If the control unit 13 determines that the number of propagations is greater than zero, the communication unit 11 transmits the beacon ID and the number of propagations, and returns to S20. The process of S20 and the subsequent steps is executed. If, however, the control unit 13 determines that the number of propagations is less than or equal to zero, the communication unit 11 directly returns to S20.

Next, a wireless communication process that is executed by a terminal device 10 other than the terminal device 10a will be described. Here, for example, the case where a terminal device 10b in the proximity of the terminal device 10a illustrated in FIG. 8 executes this process will be described, by way of example. As this process begins, the communication unit 11 of the terminal device 10b determines whether the communication unit 11 has received a beacon ID (S20). The communication unit 11 repeats the process of S20 until receiving the beacon ID, and proceeds to S22 when determining that the communication unit 11 has received the beacon ID.

In S22, the calculation unit 16 determines what information has been received along with the beacon ID. At this point, the terminal device 10b has received the beacon ID and the number of propagations transmitted by the terminal device 10a. Therefore, the calculation unit 16 determines that the beacon ID and the number of propagations have been received, and determines whether the number of propagations currently received is greater than the number of propagations previously received (S30).

If the calculation unit 16 determines that the number of propagations currently received is less than or equal to the number of propagations previously received, the current number of propagations corresponding to the beacon ID, which is the same as for the previous number of propagations, is decreased or remains the same as for the previous number of propagations. Therefore, the calculation unit 16 determines that this beacon ID has once been propagated, and returns to S20 without executing any process.

If, however, the calculation unit 16 determines that the number of propagations currently received is greater than the number of propagations previously received, the calculation unit 16 subtracts one from the received number of propagations (S32). Then, the storage unit 12 saves the number of propagations obtained by the subtraction in association with the beacon ID (S34).

Next, the control unit 13 determines whether the number of propagations is greater than zero (S36). If the control unit 13 determines that the number of propagations is greater than zero, the control unit 13 determines that further propagation of the beacon ID to another terminal device 10 is permitted. Then, the communication unit 11 transmits the beacon ID and the number of propagations (S38). Thereafter, the process returns to S20, and the process of S20 and the subsequent steps is executed.

If, however, the control unit 13 determines that the number of propagations is less than or equal to zero, the control unit 13 determines that the beacon ID has been propagated to the maximum number of terminal devices 10 and that further propagation of the beacon ID is not permitted. Then, the process directly returns to S20, and the process of S20 and the subsequent steps is executed.

The wireless communication process described above is executed by the terminal device 10a and other terminal devices, such as the terminal device 10b, until the number of propagations becomes zero. The terminal device 10a and other terminal devices 10 that have sequentially received a beacon ID from the terminal device 10a temporarily function as transmitters, propagating the beacon ID to still other terminal devices 10.

Thus, for example, in cases where the number of propagations is 11, as illustrated in FIG. 8, the terminal devices 10b, 10c, . . . , 10l that have sequentially received a beacon ID from the terminal device 10a may receive service information. By executing the above process, the delivery area for service information may be dynamically expanded from the coverage area Ar to an area including the coverage area Ar and areas Aa to Aj. Thus, service information is delivered not only to the terminal device 10a but also to the terminal devices 10b to 10l. Therefore, the terminal devices 10b to 10l may each acquire service information on a moving object by themselves before the moving object moves to the terminal devices 10b to 10l and the terminal devices 10b to 10l "check in".

For example, when service information on the runner A is delivered from the server 20 to the terminal devices 10b to 10l of users who cheer on the sidelines, the timing at which the service information is delivered to each of the terminal devices 10b to 10l is prior to the time at which the runner A passes by the user, by the amount of time for desired receipt. Thus, when the runner A passes by a user, the user may have sufficient time to reference information on the runner A before cheering the runner A on.

Figure 9:
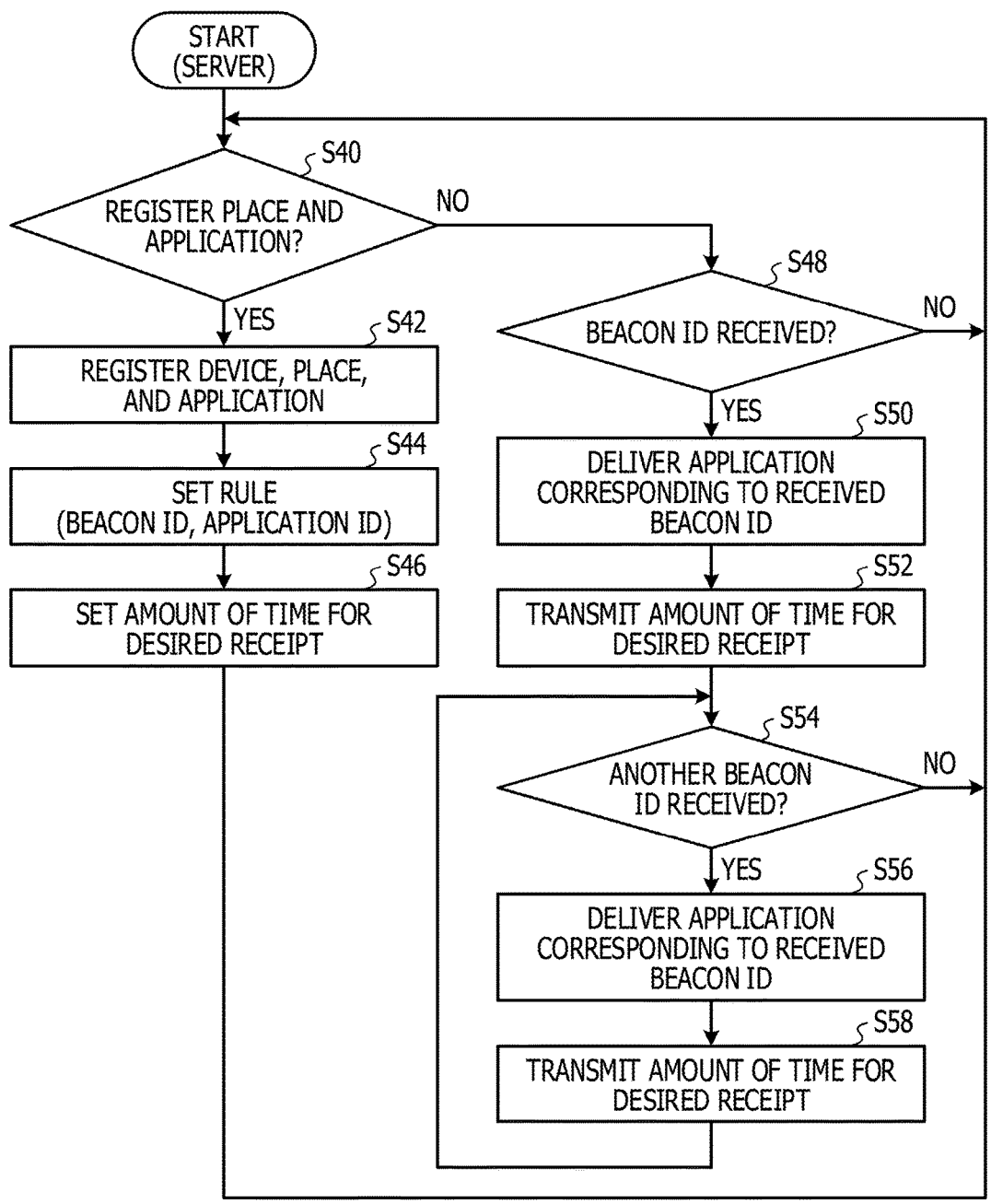
FIG. 9 is a flowchart illustrating an example of a wireless communication process of the server according to the first embodiment.

Next, a wireless communication process of the server 20 according to the first embodiment will be described. FIG. 9 is a flowchart illustrating an example of the wireless communication process of the server 20 according to the first embodiment. The process illustrated in FIG. 9 is executed by the server 20.

As this process begins, the place setting unit 23 determines whether there is a request for registration of a place and an application (S40). If the place setting unit 23 determines that there is a request for registration of a place and an application, the place registration unit 25 registers a specific place or a specific state of a specific moving object or the like as a place. Further, the app registration unit 24 registers an application corresponding to the place (S42). The device registration unit 26 registers a device that triggers the transmitter 40 and the like (S42).

Next, the rule setting unit 27 sets a rule for delivering the application (S44). According to the rule, a beacon ID, an application ID, and the like are set. Next, the storage unit 22 sets the amount of time for desired receipt (S46), and the process returns to S40.

In S40, if the place setting unit 23 determines that there is no request for registration of a place and an application, the communication unit 21 determines whether a beacon ID has been received (S48). If the communication unit 21 determines that the beacon ID has not been received, the process returns to S40. If, however, the communication unit 21 determines that the beacon ID has been received, the communication unit 21 delivers an application corresponding to the received beacon ID to the terminal devices 10 that are present in the dynamically expanded delivery area for service information (S50). At this point, the communication unit 21 transmits the application to each of the terminal devices 10 at a timing in accordance with the amount of time for desired receipt. When the service information 282 corresponding to the beacon ID 281 of the app DB 28 is not an application, service information saved in the corresponding service information 282 is delivered to the terminal devices 10.

Next, the communication unit 21 transmits the amount of time for desired receipt to the terminal devices 10 (S52). Next, the communication unit 21 determines whether another beacon ID has been received (S54). If the communication unit 21 determines that another beacon ID has not been received, the process returns to S40. If, however, the communication unit 21 determines that another beacon ID has been received, the communication unit 21 delivers an application corresponding to the received other beacon ID to the terminal devices 10 present in the dynamically expanded service area (S56). Next, the communication unit 21 transmits the amount of time for desired receipt to the terminal devices 10 (S58). The process of S54 to S58 is repeated until it is determined in S54 that another beacon ID has not been received.

Figure 10:
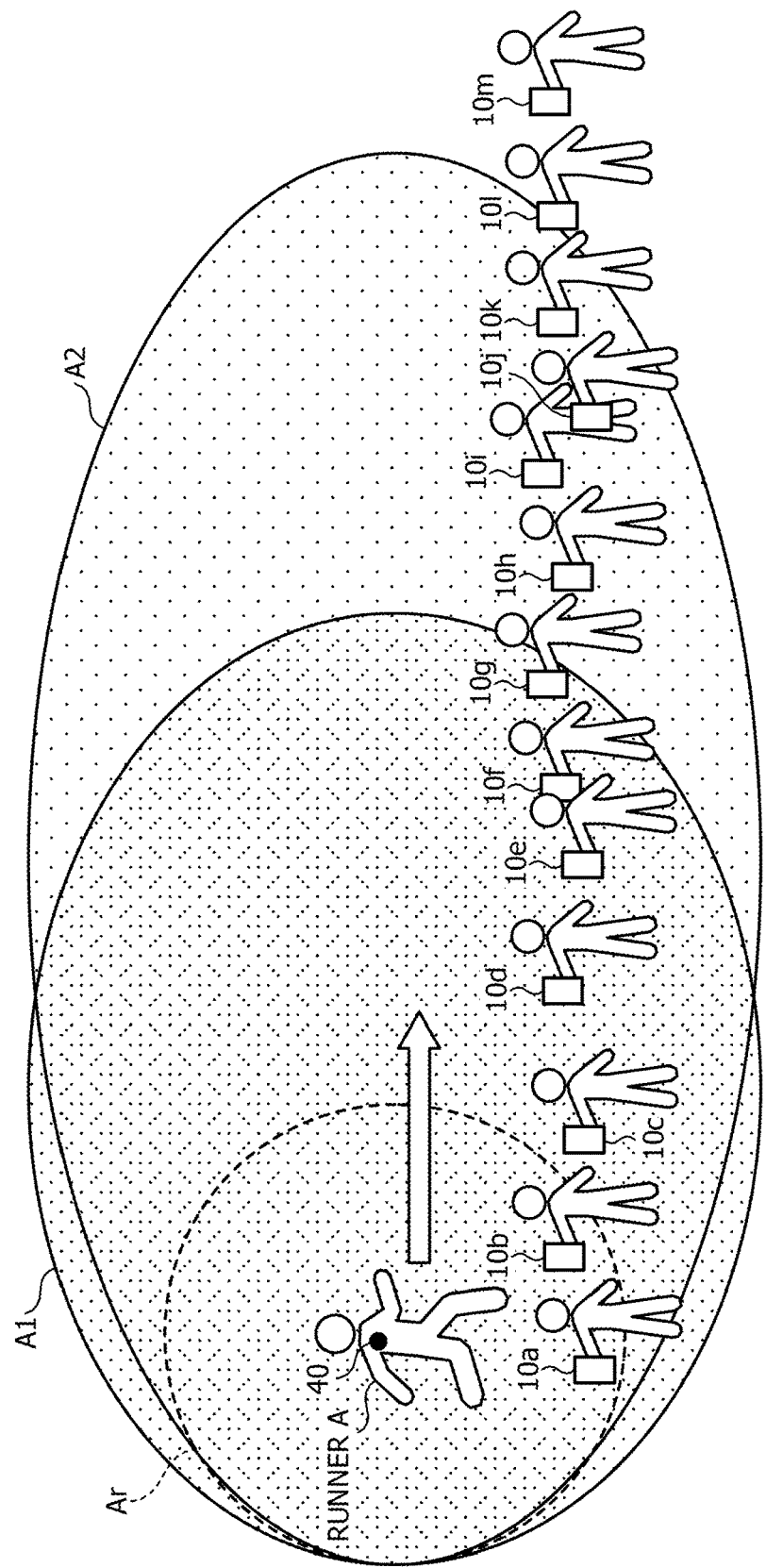
FIG. 10 is a diagram illustrating another example of dynamic control of a service area according to the first embodiment.

By executing the process of S54 to S58, as illustrated in FIG. 10, while a moving object (the runner A) is far away, service information may be provided in such a manner that the dynamically expanded place is divided into a plurality of places A1 and A2 in accordance with the degrees of proximity to the moving object. That is, different pieces of service information may be downloaded to the terminal devices 10 located at the places A1 and A2, respectively. For example, when service information associated with the place A1 is "player A (the runner A) explanatory information" of the service information 282 associated with "beacon 3" of the beacon ID 281 in the app DB 28 illustrated in FIG. 5, the service information "player A explanatory information" is transmitted to the terminal devices 10a to 10g that "have checked in" the place A1.

When service information associated with the place A2 is "player A (the runner A) image information" of the service information 282 associated with "beacon 5" of the beacon ID 281 in the app DB 28 illustrated in FIG. 5, the service information "player A image information" is transmitted to the terminal devices 10a to 10l that "have checked in" the place A2. In this case, the player A image information is assumed to be larger in the amount of information than the player A explanatory information, and thus it takes a long amount of time to download the player A image information. Therefore, the service area of the place A2 is more expanded than the service area of the place A1. Thus, the player A image information, rather than the player A explanatory information, allows the user to have sufficient time to acquire information on the player A. The process of S54 to S58 may be omitted.

As described above, with the wireless communication system 1 according to the first embodiment, without depending on the moving speed and direction of the transmitter 40, the terminal device 10 may detect approach of a moving object (the runner A) with the attached transmitter 40 to the terminal device 10 well in advance of approach of the transmitter 40. Service information on a moving object may be acquired prior to the time at which the moving object passes through the location where a terminal device is present, by the amount of time for desired receipt.

Second Embodiment

Figure 11:
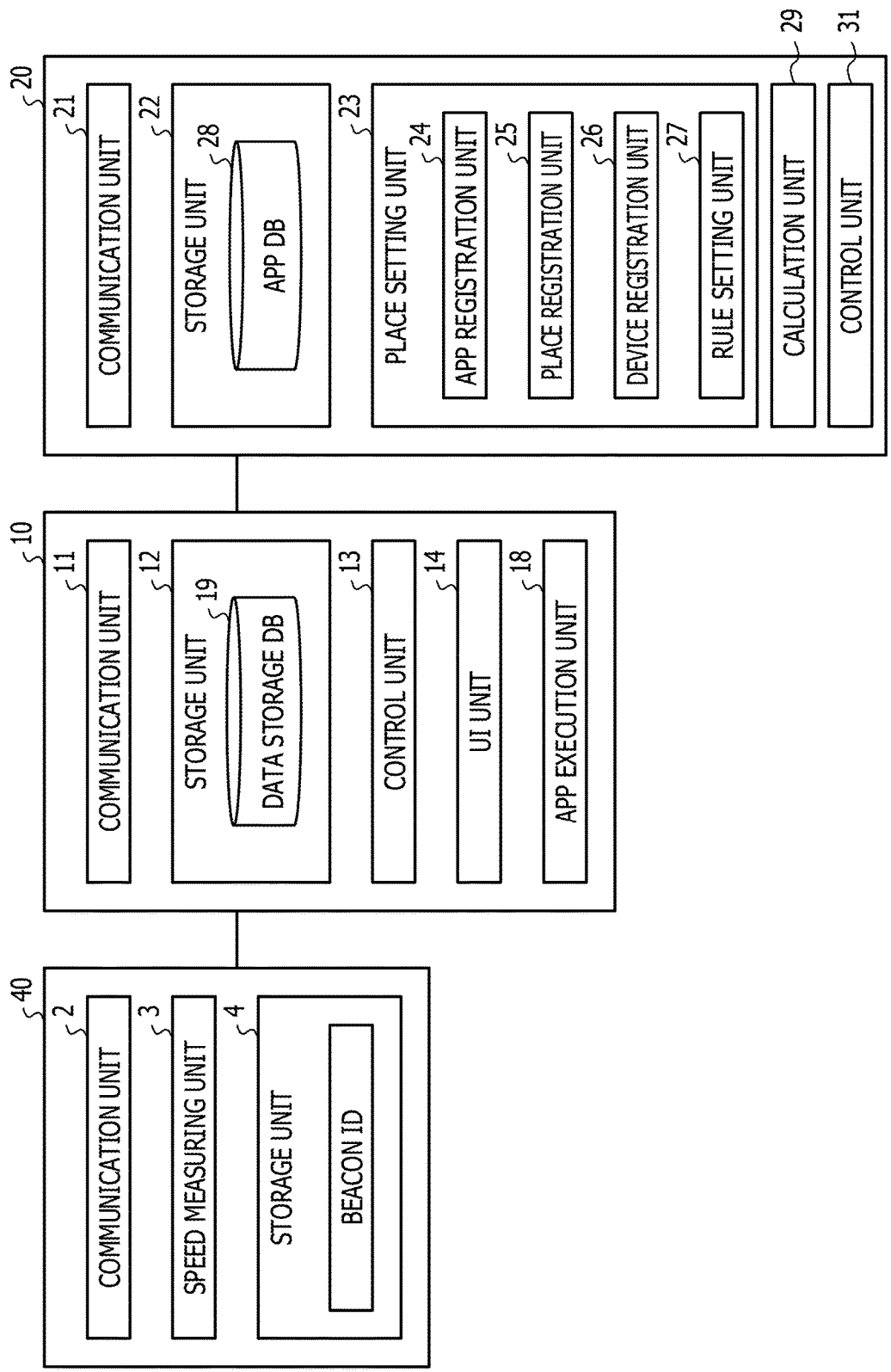
FIG. 11 is a diagram illustrating examples of functional configurations of a transmitter, a terminal device, and a server according to a second embodiment.

Examples of functional configurations of the transmitter 40, the terminal device 10, and the server 20 in the wireless communication system 1 according to the second embodiment will be described with reference to FIG. 11. FIG. 11 illustrates examples of functional configurations of the transmitter 40, the terminal device 10, and the server 20 according to the second embodiment.

The functional configuration of the transmitter 40 according to the second embodiment is the same as the functional configuration of the transmitter 40 according to the first embodiment illustrated in FIG. 3, and therefore description thereof is omitted here.

Differences from the first embodiment are that whereas the function of a control unit of dynamically changing the area into which specific information is to be transmitted and the function of a calculation unit are the functions of the terminal device 10 in the first embodiment, these functions are the functions of the server 20 in the second embodiment. A calculation unit 29 of the server 20 according to the second embodiment calculates the number of propagations, as is the case with the calculation unit 16 of the terminal device 10 according to the first embodiment. A control unit 31 of the server 20 according to the second embodiment dynamically changes an area into which specific information is to be transmitted, as is the case with the control unit 13 of the terminal device 10 according to the first embodiment.

Figure 12:
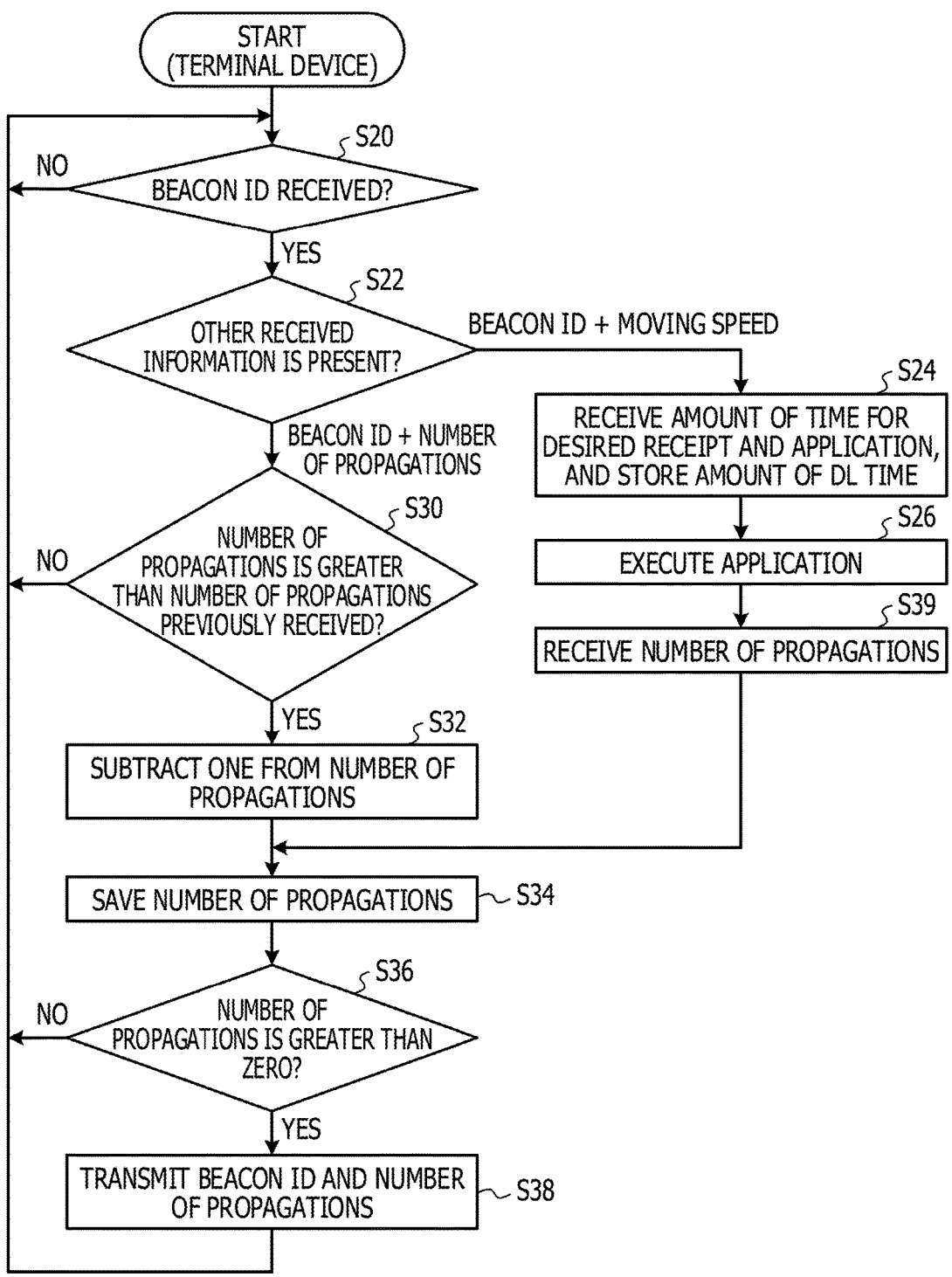
FIG. 12 is a flowchart illustrating an example of a wireless communication process of the terminal device according to the second embodiment.
Figure 13:
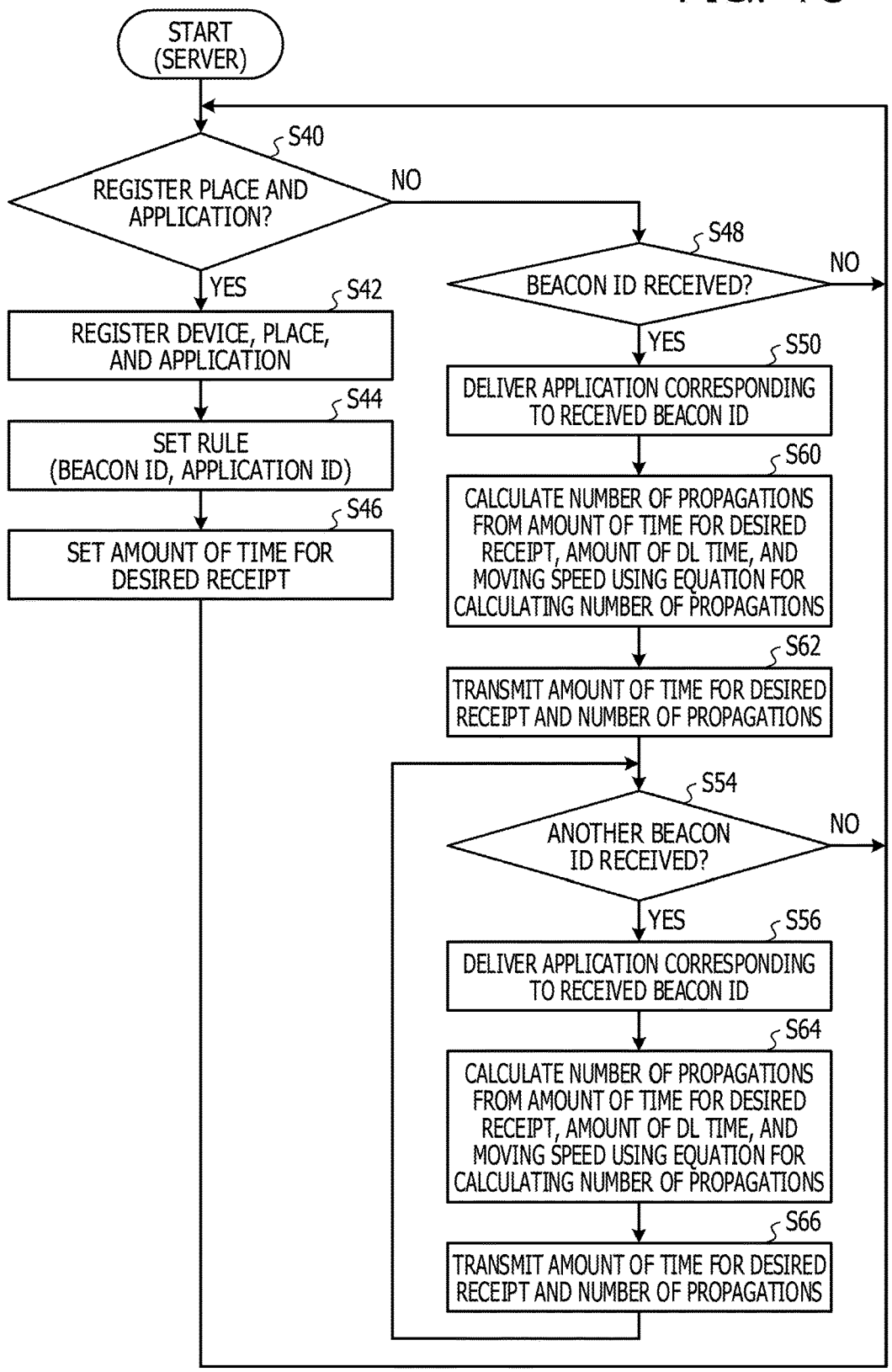
FIG. 13 is a flowchart illustrating an example of a wireless communication process of the server according to the second embodiment.

Next, wireless communication processes according to the second embodiment will be described. FIG. 12 is a flowchart illustrating an example of a wireless communication process of the terminal device 10 according to the second embodiment. FIG. 13 is a flowchart illustrating an example of a wireless communication process of the server 20 according to the second embodiment.

The process of S20 to S38 of the wireless communication process of the terminal devices 10 illustrated in FIG. 12 is the same as the process of S20 to S38 of the wireless communication process according to the first embodiment, and therefore description thereof is omitted. In the wireless communication process of the terminal device 10 according to the present embodiment, the terminal device 10 does not calculate the number of propagations. In S39 subsequent to S26, the communication unit 11 receives the number of propagations from the server 20. That is, the number of propagations is calculated by the server 20 and is transmitted from the server 20 to the terminal device 10.

The process of S40 to S50 of the wireless communication process of the server 20 illustrated in FIG. 13 is the same as the process of S40 to S50 of the wireless communication process according to the first embodiment, and therefore description thereof is omitted. In the wireless communication process of the server 20 according to the present embodiment, in S60 subsequent to S50, the calculation unit 29 calculates the number of propagations by substituting the amount of time for desired receipt, the amount of downloading time, and the moving speed in equation (1). Next, the communication unit 21 transmits the amount of time for desired receipt and the number of propagations to the terminal device 10 (S62).

Next, the process of S54, S56, S64, and S66 is executed for another beacon signal. The process of S54, S56, S64, and S66 is the same as the process of S48, S50, S60, and S62 executed for a beacon signal different from the other beacon signal, and therefore description thereof is omitted here.

In the wireless communication systems 1 according to the first and second embodiments, upon receiving a beacon ID from the terminal device 10a that has received the beacon signal, the terminal device 10b immediately transmits the same beacon ID and the number of propagations having a value obtained by subtracting one from the acquired number of propagations by using the first wireless technology. The terminal device 10a does not perform transmission by using the first wireless technology after directly receiving radio waves from the transmitter 40.

As described above, with the wireless communication systems 1 according to the first and second embodiments, specific information may be delivered at an appropriate timing to the terminal device 10 in a specific state, regardless of the movement of a moving object and the stop thereof. This reduces opportunities of missing information to be used on the spot.

For example, in the case of cheering for marathon runners, only desirable information about the target player or group may be acquired at the perfect timing from the server 20. This may provide support to information collection of spectators at the marathon, allowing the spectators to concentrate on cheering.

For example, in the case of a cyclic bus, only desirable information, such as information "the bus will soon arrive at a bus stop", may be acquired at the perfect timing from the server 20. Therefore, the bus user may effectively use time, for example, for going shopping without worrying about delay.

From the viewpoint of the system, information saying that information about which moving object is popular in terms of usage of information may be collected at high accuracy. Therefore, the service may be brushed up by using such information.

In the above, the information processing apparatus, the wireless communication system, the wireless communication program, and the wireless communication method have been described according to the embodiments described above; however, the information processing apparatus, the wireless communication system, the wireless communication program, and the wireless communication method according the present disclosure are not limited to the above embodiments, and various modifications and improvement may be made within the scope of the present disclosure. When there are a plurality of embodiments described above and modifications thereof, the embodiments and the modifications may be combined together to the extent not inconsistent herewith.

For example, when the terminal device 10 does not receive a larger number of propagations than a certain number of propagations after an elapse of a given period of time following the receipt of the certain number of propagations and a beacon ID, the terminal device 10 may determine that the moving object has passed, and "check out" the place.

The number of propagations may be automatically updated in such a manner that the usage time of an application and the reception state of radio waves from the transmitter 40 are together measured, and information on the measured time and state is transmitted to the server 20, and thereby the server 20 acquires actual reading time information and, based on the actual reading time information, substitutes reading time information for the amount of downloading time in equation (1).

It will be understood that the configurations of the wireless communication systems 1 according to the above embodiments are exemplary and are not intended to limit the scope of the present disclosure and that there are various examples of system configurations in accordance with applications and objects. For example, the system configuration in which the terminal devices 10 and the server 20 are coupled to each other via the network 30 is one configuration of the wireless communication systems according to the present embodiments; however, the embodiments are not limited to this. For example, the number of terminal devices included in the wireless communication system 1 according to each of the present embodiments is not limited as long as a plurality of terminal apparatuses are included.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication method executed by a processor included in an information processing apparatus, the wireless communication method comprising:
    changing, based on a moving speed of a moving object and an amount of downloading time for specific information that is provided to a terminal device, a transmission area into which the specific information is to be transmitted; and
    transmitting the specific information to the terminal device present in the changed transmission area,
    wherein the transmitting includes:
        calculating a number of propagations representing a maximum number of terminal devices capable of receiving the specific information, and
        transmitting the specific information so as to cause one or more terminal devices of which number does not exceed the calculated maximum number, out of a plurality of terminal devices present in the changed transmission area, to receive the specific information.

2. The wireless communication method according to claim 1, wherein
    the changing includes changing the transmission area based on the moving speed of the moving object, the amount of downloading time, and an amount of time for desired receipt, the amount of time for desired receipt representing how much earlier than a time at which the moving object arrives at the terminal device the specific information is desired to be received, and
    the transmitting includes transmitting the specific information to the terminal device at a timing in accordance with the amount of time for desired receipt.

3. The wireless communication method according to claim 2,
    wherein the amount of time for desired receipt is information set in accordance with the specific information.

4. The wireless communication method according to claim 1, further comprising:
    receiving an identifier included in a beacon signal transmitted from the moving object and the moving speed, from the terminal device that has received the beacon signal; and
    determining content of the specific information based on the received identifier.

5. The wireless communication method according to claim 4,
    wherein the calculating includes calculating the maximum number by dividing, by a distance traveled by the beacon signal, a value obtained by multiplying a sum of the amount of time for desired receipt and the amount of downloading time by the moving speed.

6. The wireless communication method according to claim 1, wherein
    the specific information includes information on the maximum number, and
    when receiving the specific information, the terminal device transfers the specific information to another terminal device out of the one or more terminal devices after decreasing the maximum number included in the specific information.

7. An information processing apparatus, comprising:
    a memory; and
    a processor coupled to the memory and configured to:
        change, based on a moving speed of a moving object and an amount of downloading time for specific information that is provided to a terminal device in a specific state relative to the moving object, a transmission area into which the specific information is to be transmitted, and
        transmit the specific information to the terminal device present in the changed transmission area, wherein the processor is configured to transmit the specific information by:
calculating a number of propagations representing a maximum number of terminal devices capable of receiving the specific information, and
transmitting the specific information so as to cause one or more terminal devices of which number does not exceed the calculated maximum number, out of a plurality of terminal devices present in the changed transmission area, to receive the specific information.

8. The information processing apparatus according to claim 7, wherein the processor is configured to:
change the transmission area based on the moving speed of the moving object, the amount of downloading time, and an amount of time for desired receipt, the amount of time for desired receipt representing how much earlier than a time at which the moving object arrives at the terminal device the specific information is desired to be received, and
transmit the specific information to the terminal device at a timing in accordance with the amount of time for desired receipt.

9. The information processing apparatus according to claim 8,
wherein the amount of time for desired receipt is information set in accordance with the specific information.

10. The information processing apparatus according to claim 7, wherein the processor is configured to:
receive an identifier included in a beacon signal transmitted from the moving object and the moving speed, from the terminal device that has received the beacon signal, and
determine content of the specific information based on the received identifier.

11. A non-transitory computer-readable recording medium storing a program that causes a processor included in an information processing apparatus to execute a process, the process comprising:
changing, based on a moving speed of a moving object and an amount of downloading time for specific information that is provided to a terminal device, a transmission area into which the specific information is to be transmitted; and
transmitting the specific information to the terminal device present in the changed transmission area,
wherein the transmitting includes:
calculating a number of propagations representing a maximum number of terminal devices capable of receiving the specific information, and transmitting the specific information so as to cause one or more terminal devices of which number does not exceed the calculated maximum number, out of a plurality of terminal devices present in the changed transmission area, to receive the specific information.

* * * * *